M. A. STICKLEY.
FARM GATE.
APPLICATION FILED MAY 12, 1914.
1,136,734.
Patented Apr. 20, 1915.
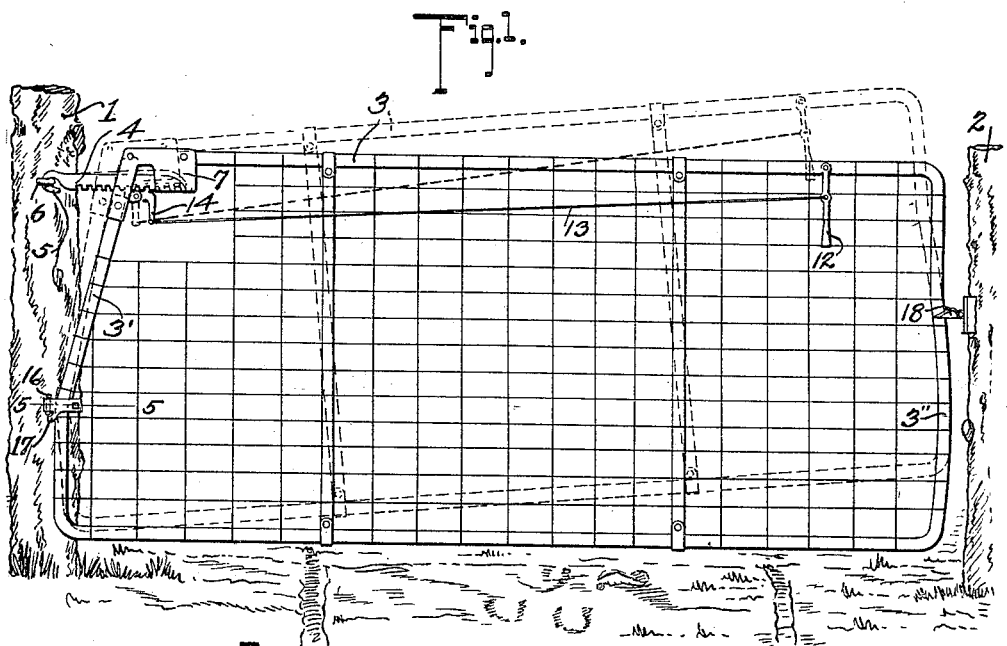
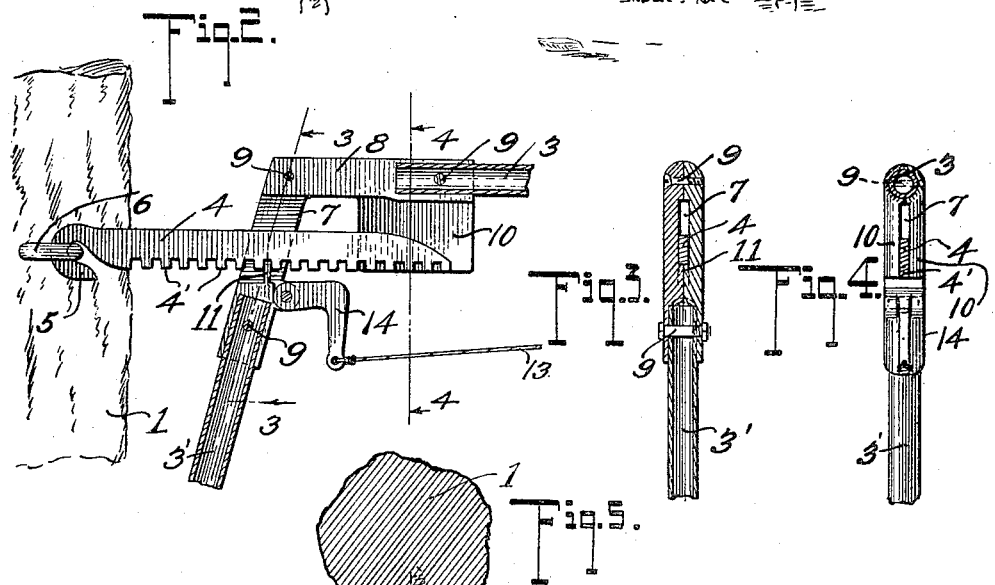
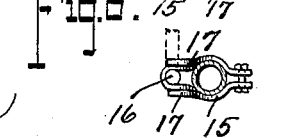
Witnesses
C. H. Wagner
L. Compton
Inventor
Marcus A. Stickley
By Robt. Robb
Attorneys

UNITED STATES PATENT OFFICE.

MARCUS ALLEN STICKLEY, OF STRASBURG, VIRGINIA.

FARM-GATE.

1,136,734. Specification of Letters Patent. Patented Apr. 20, 1915.

Application filed May 12, 1914. Serial No. 838,070.

*To all whom it may concern:*

Be it known that I, MARCUS ALLEN STICKLEY, a citizen of the United States, residing at Strasburg, in the county of Shenandoah and State of Virginia, have invented certain new and useful Improvements in Farm-Gates, of which the following is a specification.

This invention appertains to farm gates and especially that type of such gates which are supported for horizontal swinging movement and provided with means intermediate the gate and supporting post on which it is hung whereby the free or outer end of the gate may be raised or lowered and held at different vertical adjustments to provide a greater or less space beneath the gate permitting small animals to pass through such space while the gate is effective to prevent larger animals from passing thereby.

An essential feature of this invention resides in the special means whereby said vertical adjustments of the gate are adapted to be effected in that said means is arranged to positively lock the gate at different adjustments against liability of unauthorized raising or lowering movement, a defect of many gates of this type at present in use being incident to the fact that an animal is able to pry the gate upwardly at its free end and pass thereby.

Still another important feature of the present improvements wherein the gate is hingedly connected at one lower end portion with its supporting post and adjustably connected with said post at the adjacent upper end portion resides in the provision of a member at the outer or swinging end of the gate especially designed to coöperate with latch means on a suitable latch post whether the gate be disposed and locked at a low or high adjustment at said free end, or any position intermediate its maximum opposite vertical adjustments.

The invention comprehends in addition to the foregoing the utilization at the hinged end of the gate of a special hinged member permitting of the free swinging of the gate as customary but provided with peculiar means preventing accidental disengagement of the hinge parts should unauthorized lifting of the gate at its pivoted or hinged end be attempted. The hinge means last referred to is exceedingly simple and it does not necessitate the employment of bolts or complicated fastenings.

For a full comprehension of the structural details of the invention, the merits of the same under practical conditions of service, and the general operation of the parts, the full detail description may be referred to in conjunction with the annexed drawings in which:

Figure 1 is a side elevation of a farm gate embodying the invention, dotted lines showing the free or outer end of the gate upraised to provide an extra amount of space beneath the same. Fig. 2 is a fragmentary view bringing out more clearly the adjusting and locking device intermediate the hinged end of the gate and the supporting post. Fig. 3 is a sectional view taken about on the line 3—3 of Fig. 2. Fig. 4 is a similar section on the line 4—4 of Fig. 2. Figs. 5 and 6 are respectively sectional and plan views of the hinging means intermediate the lower portion of the gate and the supporting post.

While the gate illustrated in the drawings is preferably of metallic construction it is within the purview of the invention to adapt the various structural features hereinafter set forth to a wooden gate as will be readily evident.

For the purposes of this description 1 in the drawings will be termed a supporting post and 2 a latch post, the gate 3 being hingedly mounted on the former for horizontal swinging movement. The gate comprises an approximately rectangular frame and the end bar 3' has its upper portion slightly inclined toward the center of the gate as seen in Fig. 1. The connection between the upper portion of the bar 3' and the supporting post 1 comprises an adjusting and locking bar 4 formed at one end with a hook 5 engaging in an eye 6 screwed or otherwise secured in post 1. The lower edge of the bar 4 is formed with a series of spaced teeth 4' and said bar 4 passes through a slot 7 in a specially formed corner member 8 or bracket secured to the end bar 3' and the uppermost bar of the gate frame. The member 8 consists of two similarly formed plates secured together by fastenings 9, certain of said fastenings connecting the member 8 with the bars of the gate frame above referred to. The plates composing the member 8 are cast or otherwise formed to provide the slot 7 aforesaid and the pendent spaced flanges 10 between which, as well as through the slot 7 the bar 4 passes and is movable. The said plates of the member 8 are furthermore formed with lugs projecting therefrom into the space afforded by the slot 7, and by abutment with one another these lugs constitute a stop 11 with which the teeth 4' of the bar 4 are engageable. It is intended that the bar 4 shall be operable from the outer or free end of the gate 3 for which purpose a suitable lever 12 is pivoted to said end of the gate and connected by a cable or rod 13 with an angle lever 14. The lever 14 is formed with oppositely extending trunnions that are received in openings or bearings formed in lugs offstanding from the plates composing the member 8. The arrangement of the angle lever 14 is such that the intermediate portion of said lever is just beneath the bar 4 and adapted on moving the hand lever 12 in one direction to be engaged with the lower edge of said bar 4 so as to raise the teeth of the bar out of engagement with respect to the stop 11. Obviously when this is done the gate 3 is susceptible of being raised or lowered with the hinge connection intermediate the lower portion of the end bar 3' and the post 1 as a horizontal axis so to speak and when the pull on the lever 14 is relieved the bar 4 will drop back to a position with its teeth engaging the stop 11 again thereby positively locking the gate against either lowering or raising movement. Especially is the fact that the gate is locked by the bar 4 against raising movement important from a practical standpoint because it is impossible for animals such as pigs or hogs to pry the gate upwardly at its free or swinging end.

The hinge means between the post 1 and the lower portion of the bar 3' of the gate includes essentially a hinge member 15 attached in any suitable manner to the bar 3' and having a journal portion 15' receiving the vertical part of a hinge hook 16 applied to the post 1. The hinge member 15 may be a piece of strap iron bent around the end bar 3', or it may be a casting as found desirable; in either event the spaced portions of the member 15, which embrace the end bar 3' are formed with downwardly and outwardly curved locking extensions 17. When the gate is in closed position as shown in Fig. 1 one of the extensions 17 engages beneath the hook 16 and renders impossible the unauthorized lifting of the gate at its inner hinged portion. The function of the other of the extensions 17 is to afford the same locking action as just described when the gate 3 is hung on the other side of the supporting post 1 and this, of course, always depending upon the convenience of the user. It is to be noted that when the gate is in an open position since the parts 17 are spaced from one another, the gate may be readily disengaged from the post 1 owing to the separability of the hinging parts at this particular point of disposition of the gate.

Having in view the vertical adjustments of the free or swinging end of the gate 3 are effected by movement of the gate about the connection afforded by the parts 15 and 16 and that when in different positions the gate is designed to be freely swung horizontally, it is contemplated to provide special means whereby the latch means 18 on the latch post 2 will coact with the free end of the gate to lock the same closed irrespective of the degree of elevation of said end of the gate. The gate 3 is therefore provided with an end member 3" which is curved on an arc generated about the hinged connection 15 and 16 as an axis, and this curved member 3" is always capable of being engaged by the latch means 18 whether the gate is adjusted at its maximum elevation or lowermost position or any intermediate position. The latch means 18 will preferably comprise a wing latch but any suitable latch devices may be employed within the contemplation of the invention.

Having thus described my invention, what I claim as new is:

1. In combination, a supporting post, a gate adapted to be supported thereby, a locking bar pivoted to the post and adapted to slide longitudinally of the gate, means for locking the bar to the gate, a pivoted lever having an arm disposed to swing into position for swinging the bar out of engagement with the locking means, and means for actuating said lever.

2. In combination, a supporting post, a gate adapted to be supported thereby, a bar pivoted to the post and having a notched under surface, a projection on the gate adapted to engage in any one of the notches of said bar, a lever pivoted on the gate adjacent the projection, and means for swinging the lever for moving the same into contact with the under portion of the bar for lifting the bar out of engagement with the projection.

3. In combination, a supporting post, a gate adapted to be supported thereby, a bar pivoted to the post and extending into movable engagement with the gate, means for locking the bar against movement independent of the gate, an angle lever pivoted to the gate adjacent to and beneath the bar, and means for swinging the angle lever for bringing the angle thereof into contact with the bar for elevating the bar out of engagement with the locking means.

4. In combination, a gate, a supporting post therefor, hinge connections intermediate the gate and post permitting horizontal swinging of the gate, one of said connections comprising an adjusting and locking bar pivotally connected with the post, the gate being formed with a stop to positively interlock with said bar to hold the free end of the gate against unauthorized vertical movement, a lever pivoted to the gate and arranged to engage and lift said bar out of coöperation respecting the stop, and means for actuating said lever.

5. In combination, a gate, a supporting post therefor, hinge connections intermediate the gate and post permitting horizontal swinging of the gate, one of said connections comprising an adjusting and locking bar pivotally connected with the post, the gate being formed with a stop to positively interlock with said bar to hold the free end of the gate against unauthorized vertical movement, means for controlling the operation of said bar, the other of said hinge connections consisting of a hinge part attached to the post, and a hinge member carried by the gate coöperating with said hinge part and comprising an extension engaging beneath the latter when the gate is in closed position, whereby to prevent unauthorized lifting of the hinged end of the gate.

6. In combination, a supporting post, a gate, hinge means intermediate one end of the gate and said post permitting horizontal swinging of the gate, means intermediate the gate and post for holding the gate at different vertical adjustments, latch means for holding the gate in closed position, said gate comprising an end member curved on an arc generated about said hinge means as the center and coöperative with the latch means at all different vertical adjustments of the gate.

In testimony whereof I affix my signature in presence of two witnesses.

MARCUS ALLEN STICKLEY.

Witnesses:
J. F. SMITH,
G. M. LUDWIG.

Copies of this patent may be obtained for five cents each, by addressing the "Commissioner of Patents, Washington, D. C."